(No Model.)

T. A. EDISON.
MANUFACTURE OF INCANDESCING ELECTRIC LAMPS.

No. 278,415. Patented May 29, 1883.

ATTEST:
E. C. Rowlands
H. W. Seely

INVENTOR:
Thomas A. Edison
By Rich'd N. Dyer
Atty.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

MANUFACTURE OF INCANDESCING ELECTRIC LAMPS.

SPECIFICATION forming part of Letters Patent No. 278,415, dated May 29, 1883.

Application filed January 22, 1883. (No model.)

*To all whom it may concern:*

Be it known that I, THOMAS A. EDISON, of Menlo Park, in the county of Middlesex and State of New Jersey, have invented a new and useful Improvement in the Manufacture of Incandescing Electric Lamps, (Case No. 537,) of which the following is a specification.

The object of this invention is to provide a simple and convenient method of decreasing the resistance of the carbon filament of an incandescing electric lamp, which it is often desirable to do when a filament after carbonization is found to be of so much higher resistance than others that it cannot be used in the same system.

In carrying out my invention I attach to the vacuum apparatus by which the lamp-globe is exhausted a tube having its other end open, an air-tight stopper being provided for closing it when desired. I inclose within an envelope of gelatine or other suitable substance a quantity of a volatile carbon or silicon compound sufficient to reduce the resistance of the particular filament under treatment to the proper point. Suitable compounds for the purpose are chloride of carbon, chloroform, or the volatile chlorides of silicon. Said envelope should consist of such a substance that the application of heat will cause it to open either by melting or by bursting from the expansion of the inclosed liquid, such substance also not being chemically affected by the substance inclosed by it. Other suitable materials than that mentioned are collodion, fusible metal, lead, and tragacanth. The capsule thus formed is dropped into the open end of the tube, a portion of which is formed to receive it. After the lamp is exhausted heat is applied externally to this portion of the tube, when the external envelope is destroyed, and the carbon or silicon compound is freed and volatilizes, the vapor entering the globe and depositing carbon or silicon upon the filament, which is at this time heated to incandescence by an electric current. Such deposition of carbon or silicon reduces the resistance of the filament to the proper point.

Figure 1:
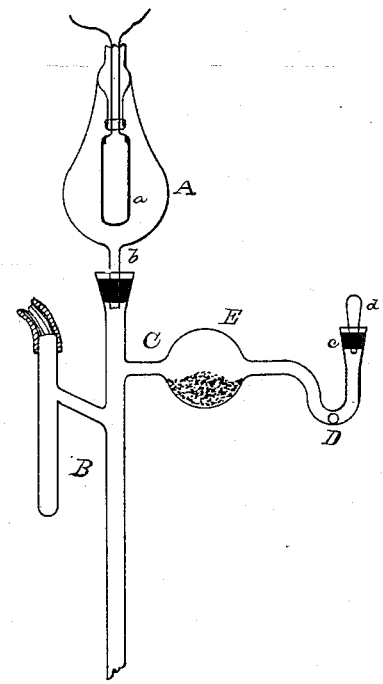
Figure 2:

The apparatus described is illustrated in Figure 1 of the annexed drawings, Fig. 2 being a sectional view of the capsule used.

A represents the inclosing-globe, and $a$ the flexible carbon filament, of an incandescing electric lamp. The globe is provided with an exhaust-tube, $b$, which is attached to the Sprengel vacuum apparatus B. A tube, C, is connected with said vacuum apparatus, having an open end, a rubber stopper, $c$, with a handle, $d$, being provided to close said opening.

D is the capsule, consisting of an envelope, $e$, of a substance readily affected, as described, by heat, and not chemically affected by the volatile carbon or silicon compound $f$, which is inclosed by it. I find this mode of introducing the carbon or silicon to be a convenient one, because I can thus employ precisely the desired amount, and because if the volatile liquid was introduced in a free state it would volatilize under the decrease of atmospheric pressure and pass off through the pump, while the outer envelope protects it until the proper time. Such envelope should be of sufficient strength to withstand the pressure from within until the external heat is applied. The capsule is dropped into the tube, which is then closed by the stopper, and the lamp and tube are exhausted, after which the action of the exhausting apparatus is stopped and heat applied to the tube. The inclosing-envelope of the capsule is destroyed either by melting or by the expansion of the vapor within it, and such vapor then enters the globe. The filament $a$ is heated to incandescence by an electric current, and the vapor is decomposed, depositing carbon or silicon upon said filament, the resistance of the filament being thus reduced.

The bulb E contains phosphoric anhydride or other drying agent.

I do not claim herein the capsule, such as described, as I propose to make this the subject of a separate application for Letters Patent.

What I claim is—

1. The method of reducing the resistance of the carbon filament of an incandescing electric lamp, consisting in introducing into a receptacle connected with said lamp a sufficient quantity of a volatile carbon or silicon compound, exhausting said lamp while such compound is prevented from volatilization, and then causing the volatilization of such compound, at the same time heating the filament to incandescence by an electric current, substantially as set forth.

2. The method of reducing the resistance of the carbon filament of an incandescing electric lamp, consisting in first exhausting said lamp and then applying heat to a capsule such as described placed in a receptacle connected with said lamp, said filament being at the same time heated to incandescence by an electric current, substantially as set forth.

This specification signed and witnessed this 13th day of January, 1883.

THOS. A. EDISON.

Witnesses:
H. W. SEELY,
EDWARD H. PYATT.